United States Patent [19]

Toyoda

[11] Patent Number: 5,799,142

[45] Date of Patent: Aug. 25, 1998

[54] DEBUGGING METHOD AND DEBUGGING SYSTEM FOR MULTI-TASK PROGRAMS

[75] Inventor: Koichi Toyoda, Tokyo, Japan

[73] Assignee: NEC Corporation, Tokyo, Japan

[21] Appl. No.: 527,007

[22] Filed: Sep. 12, 1995

[30] Foreign Application Priority Data

Sep. 12, 1994 [JP] Japan ................................. 6-216974

[51] Int. Cl.$^6$ .................................................. G06F 11/00
[52] U.S. Cl. ...................................... 395/183.14; 395/704
[58] Field of Search .............................. 395/183.14, 650, 395/700, 375, 704

[56] References Cited

U.S. PATENT DOCUMENTS

| | | | |
|---|---|---|---|
| 3,931,505 | 1/1976 | Seveik | 395/185.02 |
| 4,797,885 | 1/1989 | Orimo et al. | 395/183.14 |
| 5,038,348 | 8/1991 | Yoda et al. | 395/183.14 |
| 5,048,018 | 9/1991 | Bernstein et al. | 395/183.14 |
| 5,301,309 | 4/1994 | Sugano | 395/182.1 |

OTHER PUBLICATIONS by T.G.Lewis et al., "Introduction to Parallel Computing", Prentice–Hall, Inc., 1992.

Primary Examiner—Robert W. Beausouel, Jr.
Assistant Examiner—Ly V. Hua
Attorney, Agent, or Firm—Young & Thompson

[57] ABSTRACT

A multi-task program debugging system comprises program converting section 13, with a multi-task program being entered, for generating a multi-task converting program 15 for collating the contents of arrayed data to be processed in parallel and, with a serial program being entered, a serial converting program 14 for saving the contents of arrayed data in the corresponding position. A collated data saving section 16 saves, when the serial converting program 14 is being executed, the contents of data into a collated data file 17 in the positions of data collation. A data collating section 18 collates, when the multi-task converting program 15 is being executed, the contents of data with the collated data file 17 in data collating positions.

2 Claims, 4 Drawing Sheets

FIG. 2

```
       DIMENSION ARRAY1 (100, 1000)
       DIMENSION ARRAY2 (100)
        • • • • •
       DO I=1, 100           ┐
          DO J=1, 1000        │
             ┌─────────────┐  │
             │ Refer to ARRAY1(I,J) │  (21)
             │ Define ARRAY2(I)     │
             └─────────────┘  │
          ENDDO               │
       ENDDO                  ┘
           A Serial program
```

FIG. 3

```
       DIMENSION ARRAY1 (100, 1000)
       DIMENSION ARRAY2 (100)
    ┌──────────────────────────────────────────┐
    │ !HPF$ ALIGN ARRAY1 (I,*) WITH ARRAY2 (I) │  (31)
    │ !HPF$ DISTRUBUTE ARRAY2 (CYCLIC)         │
    └──────────────────────────────────────────┘
        • • • •
    ┌────────┐
    │ *PARDO │ (32)
    └────────┘
       DO I=1, 100           ┐
          DO J=1, 1000        │
             ┌─────────────┐  │
             │ Refer to ARRAY1(I,J) │  (33)
             │ Define ARRAY2(I)     │
             └─────────────┘  │
          ENDDO               │
       ENDDO                  ┘
          A multi-task program
```

FIG. 4

```
       DIMENSION ARRAY1 (100, 1000)
       DIMENSION ARRAY2 (100)
        • • • •
       *SAVE ARRAY1, 100*1000*4  ----- (41)
       DO I=1, 100
          DO J=1, 1000
             ┌─────────────┐
             │ Refer to ARRAY1(I,J) │
             │ Define ARRAY2(I)     │
             └─────────────┘
          ENDDO
       ENDDO
       *SAVE ARRAY2, 100*4       ----- (42)
           A serial converting program
```

FIG. 5

```
              DIMENSION ARRAY1 (100, 1000)
              DIMENSION ARRAY2 (100)
    !HPF$ ALIGN ARRAY1 (I,*) WITH ARRAY2 (I)         (43)
    !HPF$ DISTRUBUTE ARRAY2 (CYCLIC)
              . . . . .
          *CHECK ARRAY1, 100*1000*4  ---- (51)
          *PARDO
              DO J=1, 1000
                DO I=1, 100
                    Refer to ARRAY1(I,J)
                    Define   ARRAY2(I)
                ENDDO
              ENDDO
          *CHECK ARRAY2, 100*4      ----- (52)
              Multi-task converting program
```

FIG. 6

| ARRAY1 | |
|---|---|
| size | value |
|  |  |
|  |  |
|  |  |
|  | ⋮ |

| ARRAY2 | |
|---|---|
| size | value |
|  |  |
|  |  |
|  |  |
|  | ⋮ |

Collated data file

DEBUGGING METHOD AND DEBUGGING SYSTEM FOR MULTI-TASK PROGRAMS

BACKGROUND OF THE INVENTION

1. Field of the Invention

The present invention relates to a debugging method and a debugging system for multi-task programs to be executed on a multiprocessor system of a distributed memory type.

2. Description of the Related Art

It is possible to generate a multi-task program by rewriting arrayed data, stated in a serial program to be executed on a single processor system, so as to be distributed among the individual processors of a multiprocessor system for simultaneous processing.

In a multi-processor system of a distributed memory type, the processors can be efficiently utilized and the performance of program execution improved by executing a multi-task program generated in such a manner.

In order to confirm that such a multi-task program can give the same results of processing as the original serial program, i.e. to confirm that the multi-task program is equivalent to the serial program, the values of arrayed data to be processed separately in each task should be checked.

According to the prior art, a break point was set with a debugger in the position where the values of arrayed data should be checked, and the values were thereby confirmed.

This method according to the prior art, however, involves the problem that the values of arrayed data may become incorrect after having passed the break point several times, making it impossible to detect errors efficiently.

Furthermore, Lewis et. al., *Introduction to Parallel Computing*, Prentice-Hall, Inc., 1992 describes a method to check, when a serial program is to be parallelized, whether the multi-task program is correct or not.

This method by Lewis et. al., however, has the problem that, because the results of execution of the multi-task program are not actually analyzed, it is impossible to precisely check whether the multi-task program is correct or not, i.e. impossible to accurately judge whether the serial program can be parallelized or not.

SUMMARY AND OBJECTS OF THE INVENTION

An object of the present invention is to correctly generate a multi-task program from a serial program.

Another object of the invention is to detect any error that may arise in rewriting a serial program into a multi-task program.

Still another object of the invention is to efficiently debug a multi-task program, prepared on the basis of a serial program, without altering the results of its execution.

A first debugging method for multi-task programs according to the invention performs processing by the following steps.

This is a multi-task program debugging method to verify the correctness of a multi-task program which has been rewritten to arrange arrayed data, which are to be processed in the loop of a serial program, in a manner distributed to the memories of individual processors of a distributed memory type multiprocessor system so that they can be processed by the individual processors in parallel, wherein:

the value and size of the arrayed data in the position of parallel processing by the execution of said serial program are obtained, further the value and size of the arrayed data in the position of parallel processing by the execution of said multi-task program are obtained and, after that, if the values and sizes of the arrayed data in the two positions of parallel processing are found unidentical, an output to the effect that said serial program is not equivalent to said multi-task program is given.

A second debugging method for multi-task programs according to the invention performs processing by the following steps.

This is a multi-task program debugging method to verify the correctness of a multi-task program which has been rewritten to arrange arrayed data, which are to be processed in the loop of a serial program, in a manner distributed to the memories of individual processors of a distributed memory type multiprocessor system so that they can be processed by the individual processors in parallel:

a serial converting program consisting of said serial program supplemented with an instruction to obtain the value and size of the arrayed data in the position of parallel processing and a multi-task converting program consisting of said multi-task program supplemented with an instruction to obtain the value and size of the arrayed data in the position of parallel processing are executed and, after that, if the values and sizes of the arrayed data in the two positions of parallel processing are found unidentical, an output to the effect that said serial program is not equivalent to said multi-task program is given.

A first debugging system for multi-task programs according to the invention has the following configuration.

This is a multi-task program debugging system to verify the correctness of a multi-task program which has been rewritten to arrange arrayed data, which are to be processed in the loop of a serial program, in a manner distributed to the memories of individual processors of a distributed memory type multiprocessor system so that they can be processed by the individual processors in parallel, wherein:

data collating means obtains the value and size of the arrayed data in the position of parallel processing by the execution of said serial program as well as the value and size of the arrayed data in the position of parallel processing by the execution of said multi-task program and, if the values and sizes of the arrayed data in the two positions of parallel processing are found unidentical, gives an output unit an output to the effect that said serial program is not equivalent to said multi-task program.

A second debugging system for multi-task programs according to the invention has the following configuration.

This is a multi-task program debugging system to verify the correctness of a multi-task program which has been rewritten to arrange arrayed data, which are to be processed in the loop of a serial program, in a manner distributed to the memories of individual processors of a distributed memory type multiprocessor system so that they can be processed by the individual processors in parallel, wherein:

data collating means executes a serial converting program consisting of said serial program supplemented with an instruction to obtain the value and size of the arrayed data in the position of parallel processing and a multi-task converting program consisting of said multi-task program supplemented with an instruction to obtain the value and size of the arrayed data in the position of parallel processing and, if the values and sizes of the arrayed data in the two positions of parallel processing are found unidentical, gives an output unit an output to the effect that said serial program is not equivalent to said multi-task program.

A third debugging system for multi-task programs according to the invention has the following configuration.

This is a multi-task program debugging system to verify the correctness of a multi-task program which has been rewritten to arrange arrayed data, which are to be processed in the loop of a serial program, in a manner distributed to the memories of individual processors of a distributed memory type multiprocessor system so that they can be processed by the individual processors in parallel, wherein:

program converting means, with said serial program being entered, generates a serial converting program consisting of said serial program supplemented with an instruction to save the value and size of the arrayed data in the position of parallel processing into a collated data file and, with said multi-task program being entered, also generates a multi-task converting program consisting of said multi-task program supplemented with an instruction to collate the value and size of the arrayed data in the position of parallel processing with the value and size of the arrayed data in the position of parallel processing saved into said collated data file.

Collated data saving means executes said serial converting program to save the value and size of the arrayed data in the position of parallel processing into said collated data file.

Data collating means executes said multi-task converting program to judge whether or not the value and size of the arrayed data in the position of parallel processing are identical with the value and size of the arrayed data saved in said collated data file and, if they are found unidentical, gives an output unit an output to the effect that said serial program is not equivalent to said multi-task program.

A fourth debugging system for multi-task programs according to the invention has the following configuration.

This is a multi-task program debugging system to verify the correctness of a multi-task program which has been rewritten to arrange arrayed data, which are to be processed in the loop of a serial program, in a manner distributed to the memories of individual processors of a distributed memory type multiprocessor system so that they can be processed by the individual processors in parallel, wherein:

program converting means, with said serial program being entered, generates a serial converting program consisting of said serial program supplemented with an instruction to save the value and size of referred-to arrayed data into a collated data file before a parallel loop and an instruction to save the value and size of defined arrayed data into the collated data file after the parallel loop and, with said multi-task program being entered, also generates a multi-task converting program consisting of said multi-task program supplemented with an instruction to collate the value and size of the referred-to arrayed data with the results of execution of said serial program saved into said collated data file before the parallel loop and to collate the value and size of the defined arrayed data with the results of execution of said serial program saved into said collated data file after the parallel loop.

Collated data saving means, when said serial converting program is being executed, saves the value and size of the referred-to arrayed data into said collated data file before the parallel loop, and saves the value and size of the defined arrayed data into said collated data file after the parallel loop.

Data collating means, when said multi-task converting program is being executed, judges whether or not the value and size of the referred-to arrayed data are identical with the value and size of the arrayed data, referred to by said serial converting program, saved by said collated data saving means into said collated data file before the parallel loop, judges whether or not the value and size of the defined arrayed data are identical with the value and size of the arrayed data, defined by said serial converting program, saved by said collated data saving means into said collated data file after the parallel loop and, if they are found unidentical in either judgment, gives an output unit an output to the effect that said serial program is not equivalent to said multi-task program.

BRIEF DESCRIPTION OF THE DRAWINGS

The present invention will be understood more fully from the following detailed description given here below and from the accompanying drawings of a preferred embodiment thereof, which, however, should not be regarded as limiting the scope of the invention but are only for better explanation and ensuring fuller understanding.

FIG. 2 illustrates an example of the serial program 11 in the preferred embodiment of the invention.

FIG. 3 illustrates an example of the multi-task program 12 in the preferred embodiment of the invention.

FIG. 4 illustrates an example of the serial converting program 14 in the preferred embodiment of the invention.

FIG. 5 illustrates an example of the multi-task converting program 15 in the preferred embodiment of the invention.

FIG. 6 illustrates an example of the collated data file 17 in the preferred embodiment of the invention.

Here, it should be noted that like reference numerals represent like elements throughout the disclosure.

DETAILED DESCRIPTION OF THE PREFERRED EMBODIMENT

Now a preferred embodiment of the present invention will be described in detail with reference to drawings.

Figure 1:
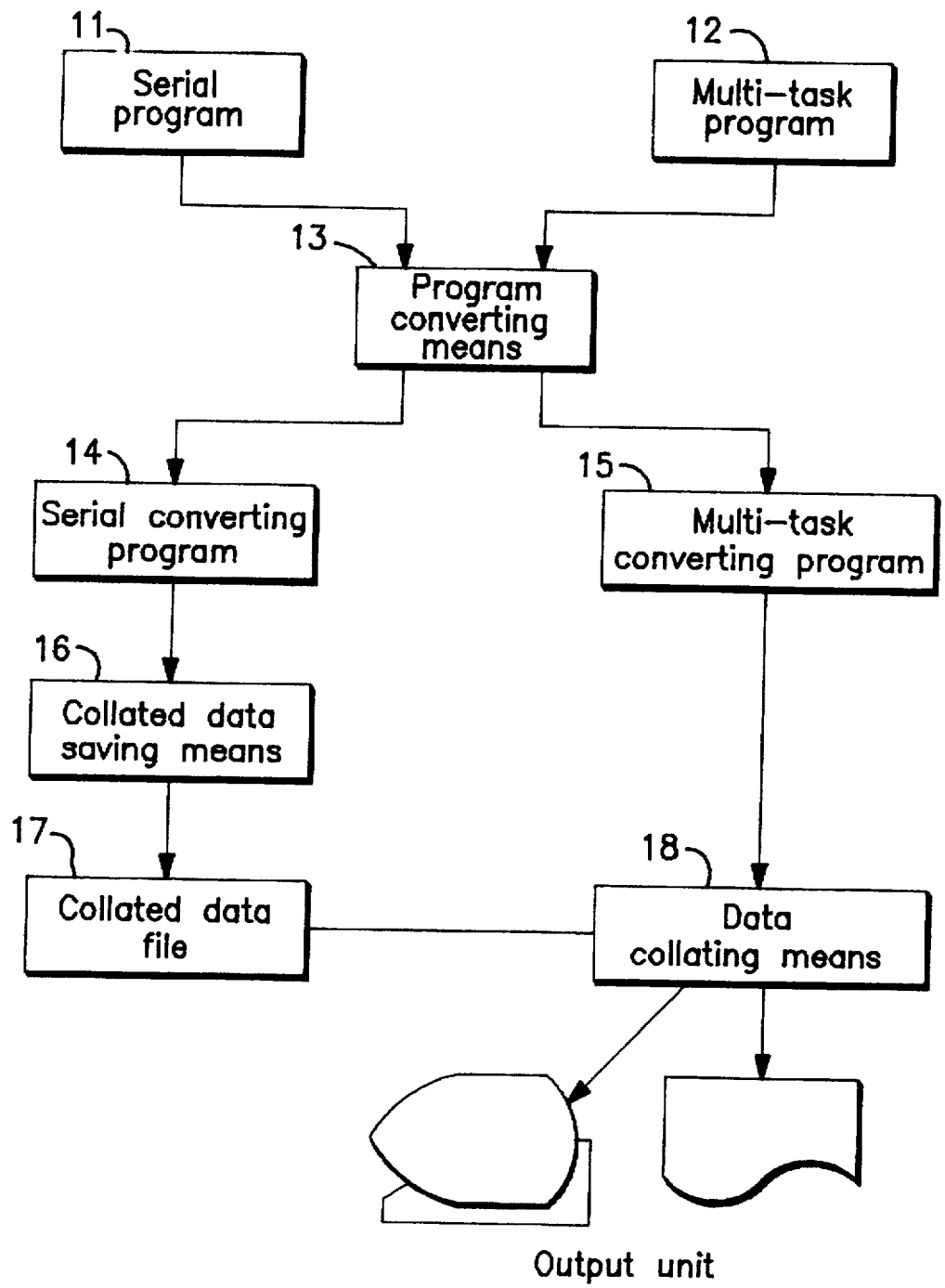
FIG. 1 is a block diagram illustrating a preferred embodiment of the present invention.
Figure 7:
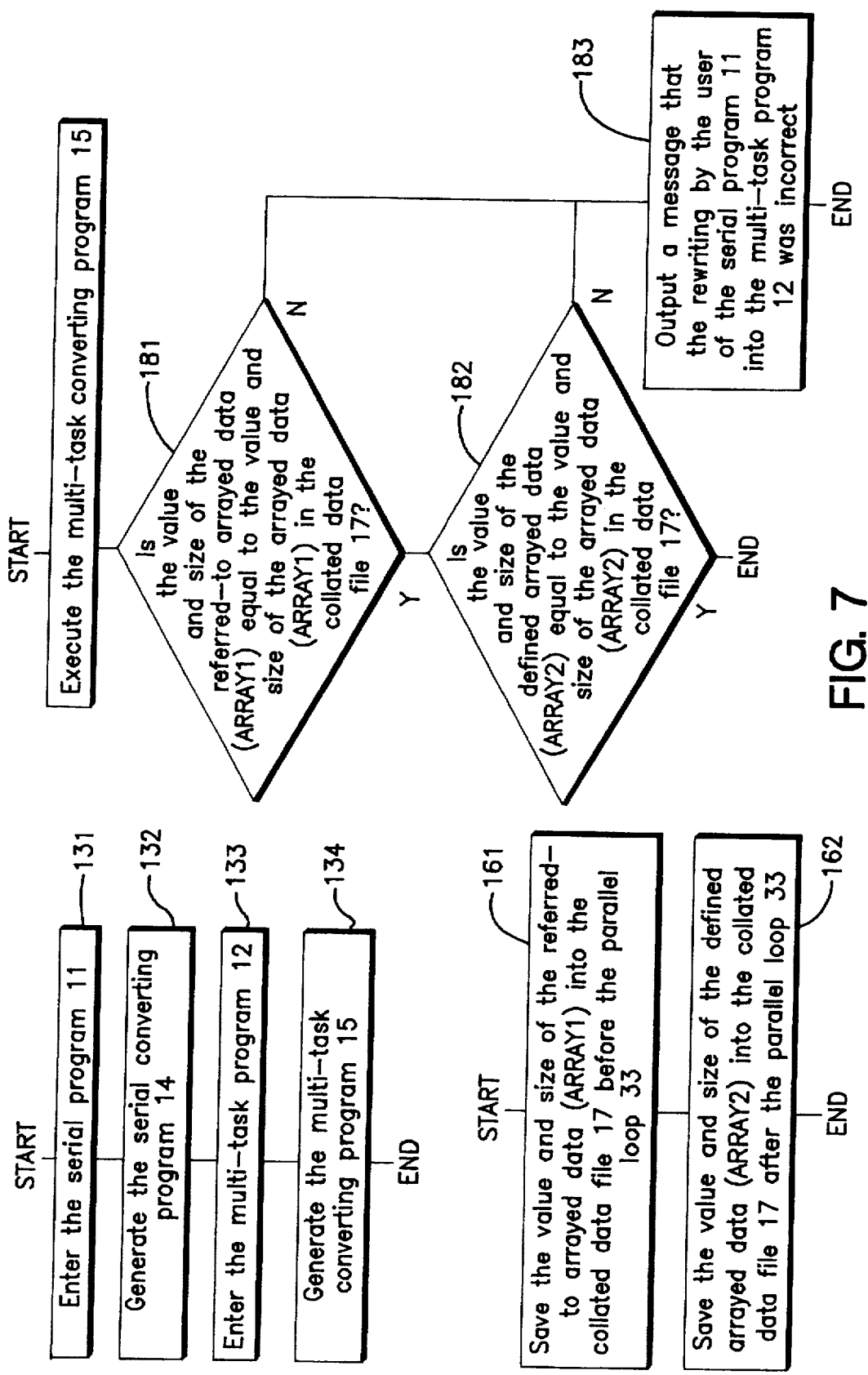
FIG. 7 is a flow chart showing the processing by the program converting means 13, the collated data saving means 16 and the data collating means 18 in the preferred embodiment of the invention.

Referring to FIG. 1, a debugging system for multi-task programs, which is a preferred embodiment of the invention, comprises a program converting program (hereinafter called program converting means) 13 which is a program for generating, where the user of a distributed memory type multiprocessor system is to rewrite a serial program 11 so that arrayed data be arranged on the memories of individual processors in a distributed manner and the arrayed data be processed by the processors in parallel, a multi-task converting program 15 consisting of a multi-task program 12 supplemented with an instruction to collate the value and size of the arrayed data to be processed in parallel, and a serial converting program 14 consisting of a serial program 11 supplemented with an instruction to save the value and size of the arrayed data in the position corresponding to said parallel processing section; a collated data saving program (hereinafter called collated data saving means) 16 which is a program for saving, when the serial converting program 14 is being executed, the value and size of data into a collated data file 17 every time the position of data collation is passed; and a data collating program (hereinafter called data collating means) 18 which is a program for collating, when the multi-task converting program 15 is being executed, the size and value of data with the collated data file 17 in every data collating position to judge whether or not the multi-task program 12 is equivalent to the serial program 11 and, if the multi-task program 12 is not found equivalent to the serial program 11, gives an output to that effect to an output unit.

Next will be described a multi-task program debugging system, which is a preferred embodiment of the present invention, with reference to FIGS. 1 through 6.

With a view to efficiently using the processors of the multi-processor system and reducing the program processing time, the user rewrites the serial program 11 shown in FIG. 2 into the multi-task program 12 shown in FIG. 3. In this particular embodiment, as illustrated in FIG. 3, the user adds an instruction 31 to distribute the arrays (ARRAY 1 and ARRAY 2) to be processed in a loop 33 to the memories of the individual processors and an instruction 32 for parallel execution to reduce the processing time of a loop 21.

The program converting means 13, into which the serial program 11 is entered (step 131), generates the serial converting program 14 which, as illustrated in FIG. 4, consists of arrayed data (ARRAY 1 and ARRAY 2) arranged in a distributed manner to be processed in parallel on the multi-task program 12, supplemented with an instruction 41 to save the value and size of the referred-to arrayed data (ARRAY 1) into the collated data file before the loop 33 and an instruction 42 to save the value and size of the defined data (ARRAY 2) into the collated data file after the loop 33 (step 132).

The program converting means 13, into which the multi-task program 12 is entered (step 133), regarding the parallel loop 33 which is defining and referring to the arrayed data (ARRAY 1 and ARRAY 2) distributed to the individual processors, generates the multi-task converting program 15 which, as illustrated in FIG. 5, is supplemented with an instruction 51 to collate the value and size of the referred-to arrayed data (ARRAY 1) with the results of execution of the serial program 11 before the parallel loop 33 and an instruction 52 to collate the value and size of the defined arrayed data (ARRAY 2) with the results of execution of the serial program 11 after the loop 33 (step 134).

The collated data saving means 16, when the serial converting program 14 is being executed, regarding the arrayed data (ARRAY 1 and ARRAY 2) arranged in a distributed manner for parallel processing on the multi-task program 12, saves the value and size of the referred-to arrayed data (ARRAY 1) into the collated data file 17 of the form shown in FIG. 6 before the parallel loop 33 (step 161) and saves the value and size of the defined arrayed data (ARRAY 2) into the collated data file 17 after the parallel loop 33 (step 162) in accordance with the instructions added by the program converting means 13.

The data collating means 18, when the multi-task converting program 15 is being executed, regarding the parallel loop 33 which is defining and referring to the the arrayed data (ARRAY 1 and ARRAY 2) arranged in a distributed manner for parallel processing on the multi-task program 12, collates the value and size of the referred-to arrayed data (ARRAY 1) with the value and size of the arrayed data (ARRAY 1) which are the results of execution of the serial converting program 14, supplied by the collated data saving means 16 to the collated data file 17, before the parallel loop 33 (step 181), and collates the value and size of the defined arrayed data (ARRAY 2) with the value and size of the arrayed data (ARRAY 2) which are the results of execution of the serial converting program 14, supplied by the collated data saving means 16 into the collated data file 17, after the parallel loop 33 (step 182) in accordance with the instructions added by the program converting means 13.

The data collating means 18, if collation at step 181 or 182 indicates non-identity between the results, gives the output unit an output to the effect that the serial program 11 shown in FIG. 2 is not equivalent to the multi-task program 12 shown in FIG. 3, i.e. the rewriting by the user of the serial program 11 into the multi-task program 12 was incorrect (step 183).

Thus is completed the processing by the multi-task program debugging system, which is a preferred embodiment of the present invention.

The multi-task program debugging system, which is a preferred embodiment of the invention, has the advantage of being able to detect any error which may have occurred during the rewriting of a serial program into a multi-task program.

As hitherto described, a feature of the multi-task program debugging system according to the present invention consists in that program converting means, with a serial program being entered, generates a serial converting program consisting of the serial program supplemented with an instruction to save the value and size of referred-to arrayed data into a collated data file before a parallel loop and an instruction to save the value and size of defined arrayed data into the collated data file after the parallel loop and, with a multi-task program being entered, also generates a multi-task converting program consisting of the multi-task program supplemented with an instruction to collate the value and size of the referred-to arrayed data with the results of execution of the serial program saved into the collated data file before the parallel loop and to collate the value and size of the defined arrayed data with the results of execution of the serial program saved into the collated data file after the parallel loop.

Another feature of the multi-task program debugging system according to the invention consists in that collated data saving means, when the serial converting program is being executed, saves the value and size of the referred-to arrayed data into the collated data file before the parallel loop, and saves the value and size of the defined arrayed data into the collated data file after the parallel loop.

Still another feature of the multi-task program debugging system according to the invention consists in that data collating means, when the multi-task converting program is being executed, judges whether or not the value and size of the referred-to arrayed data are identical with the value and size of the arrayed data, referred to by the serial converting program, saved by the collated data saving means into the collated data file before the parallel loop, judges whether or not the value and size of the defined arrayed data are identical with the value and size of the arrayed data, defined by the serial converting program, saved by the collated data saving means into the collated data file after the parallel loop and, if they are found unidentical in either judgment, gives an output unit an output to the effect that the serial program is not equivalent to the multi-task program.

Because of these features, the multi-task program debugging system according to the invention has an advantage of being able to detect any error that may arise in rewriting a serial program into a multi-task program.

The invention has another advantage of making it possible to efficiently debug a multi-task program, prepared on the basis of a serial program, without altering the results of its execution.

The invention has still another advantage of making possible correct generation of a multi-task program from a serial program.

Although the invention has been described in detail above in connection with a preferred embodiment thereof, it will be appreciated by those skilled in the art that this embodiment has been provided solely for the purpose of illustration, and is in no way to be regarded as limiting the scope of the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. A system for debugging multi-task programs, comprising:

means for converting a serial program from which a multi-task program was generated, into a converted serial program containing an instruction to save a first array of data generated prior to the execution of a parallel loop, and an instruction to save a second array of data generated after the execution of said parallel loop;

means for converting said multi-task program into a converted multi-task program containing an instruction to save a third array of data generated prior to execution of a parallel loop, and an instruction to save a fourth array of data generated after execution of said parallel loop;

means for executing said converted serial program, thereby to generate said first and second data arrays;

means for saving at least said first and second data arrays;

means for executing said converted multi-task program, thereby to generate said third and fourth data arrays;

means for collating said first and third data arrays and said second and fourth data arrays, respectively; and means for generating an output indicative of a lack of identity between said first and third or said second and fourth data arrays.

2. A method for debugging multi-task programs, comprising:

converting a serial program from which a multi-task program was generated, into a converted serial program containing an instruction to save a first array of data generated prior to the execution of a parallel loop, and an instruction to save a second array of data generated after the execution of said parallel loop;

converting said multi-task program into a converted multi-task program containing an instruction to save a third array of data generated prior to execution of a parallel loop, and an instruction to save a fourth array of data generated after execution of said parallel loop;

executing said converted serial program, thereby to generate said first and second data arrays;

saving at least said first and second data arrays; executing said converted multi-task program, thereby to generate said third and fourth data arrays;

collating said first and third data arrays and said second and fourth data arrays, respectively; and generating an output indicative of a lack of identity between said first and third or said second and fourth data arrays.

* * * * *